United States Patent [19]

Whitecar et al.

[11] Patent Number: 5,327,132
[45] Date of Patent: Jul. 5, 1994

[54] COMPOSITE SIGNAL GENERATION AND DECODING IN DIGITAL SIGNAL PROCESSING AUTOMOTIVE AUDIO SYSTEM

[75] Inventors: John E. Whitecar, Plymouth; Gregory R. Hamel, Livonia; Sylvester P. Porambo, Canton, all of Mich.

[73] Assignee: Ford Motor Company, Dearborn, Mich.

[21] Appl. No.: 980,070

[22] Filed: Nov. 23, 1992

[51] Int. Cl.⁵ .............................................. H03M 1/12
[52] U.S. Cl. ........................................ 341/141; 381/2; 369/5; 360/20
[58] Field of Search ............... 341/141; 360/20, 30; 369/4, 5, 86, 87; 381/2, 3, 4, 14; 455/345, 346, 349

[56] References Cited

U.S. PATENT DOCUMENTS

| | | | |
|---|---|---|---|
| 4,531,232 | 7/1985 | Sakurai | 455/345 |
| 4,703,340 | 10/1987 | Balaban et al. | 358/19 |
| 4,712,250 | 12/1987 | Michels et al. | 455/345 |
| 5,124,707 | 6/1992 | Stove | 341/157 |
| 5,227,794 | 7/1993 | Whitehart | 341/141 |
| 5,257,312 | 10/1993 | Therssen et al. | 381/4 |

FOREIGN PATENT DOCUMENTS

| | | | |
|---|---|---|---|
| 3233-810-A | 3/1984 | Fed. Rep. of Germany | 381/2 |
| 01-22223 | 5/1989 | Japan | 381/2 |

OTHER PUBLICATIONS

Sanyo Audio Integrated Circuits Specifications Oct. 1991.

Primary Examiner—Howard L. Williams
Attorney, Agent, or Firm—Mark Mollon; Roger L. May

[57] ABSTRACT

A digital signal processing automotive audio system uses an analog audio source providing stereo output signals. One of the stereo signals is mixed to a distinct frequency band and summed with the other stereo signal to form a composite signal which can be digitized in a single analog-to-digital converter. Separate digital stereo signals are recovered using digital signal processing.

5 Claims, 2 Drawing Sheets

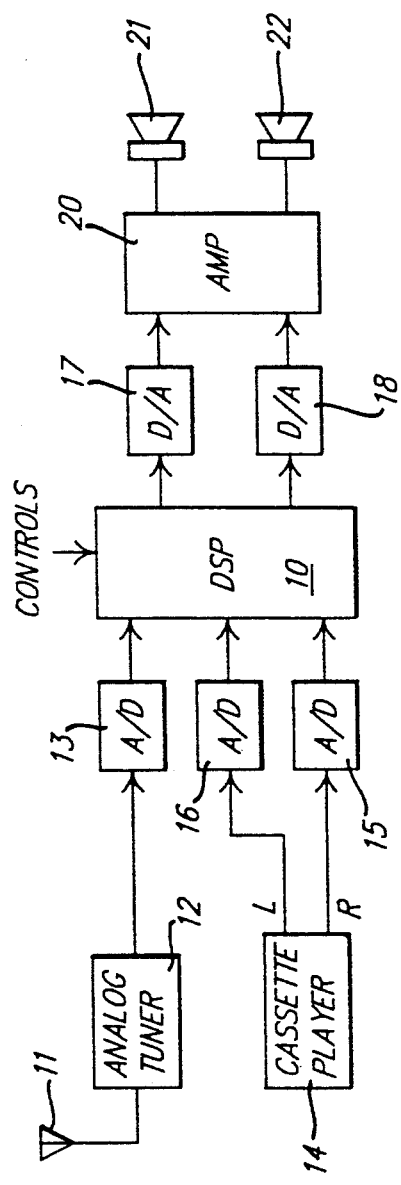
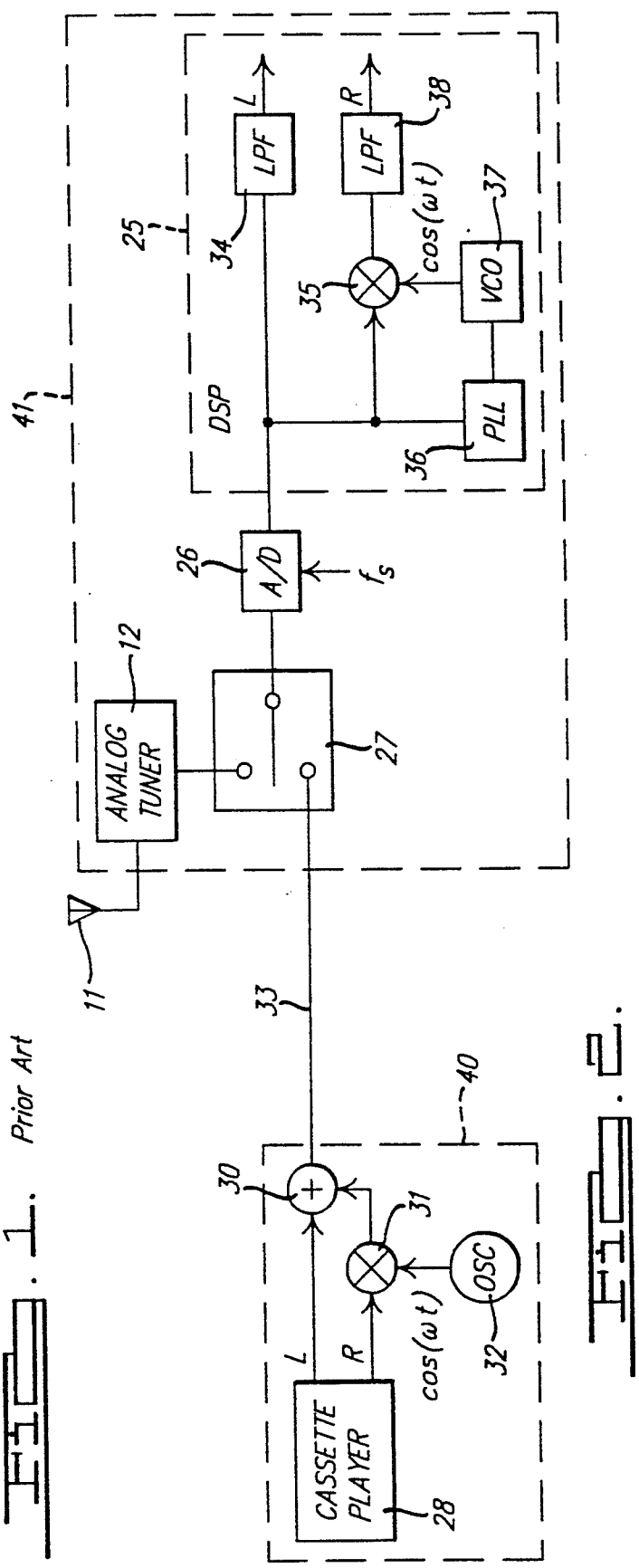

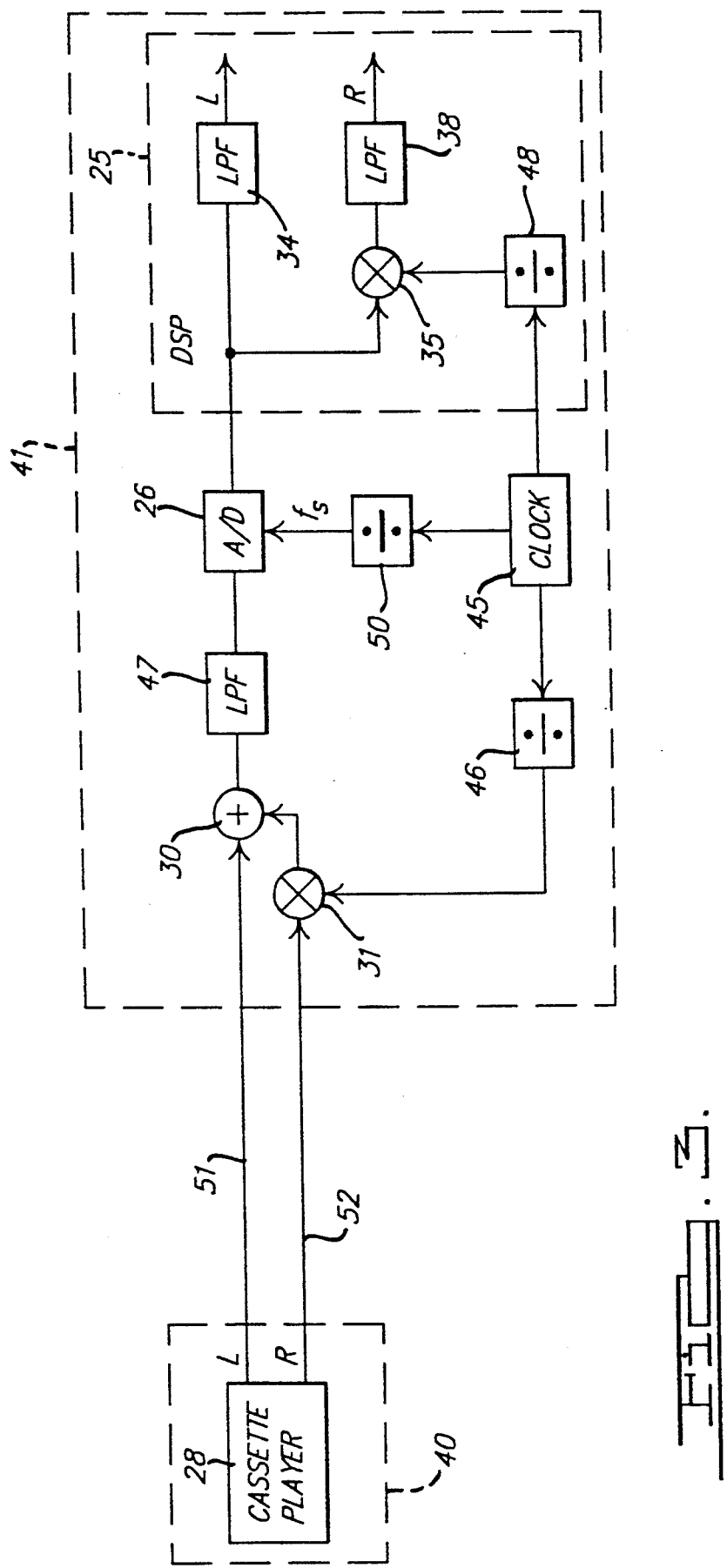

COMPOSITE SIGNAL GENERATION AND DECODING IN DIGITAL SIGNAL PROCESSING AUTOMOTIVE AUDIO SYSTEM

BACKGROUND OF THE INVENTION

The present invention relates in general to a digital signal processing automotive radio system having an analog audio source, and more specifically, to generating an analog composite signal from a stereo signal source for digitizing with a single analog-to-digital (A/D) converter.

Digital signal processing (DSP) is being adopted in many electronics applications, such as digital audio systems, signal measurement and analysis, and communications. DSP uses specialized microprocessors that are adapted to perform the signal processing function digitally and at a high rate of speed. DSP achieves advantages in programming flexibility, inherent stability, increased accuracy, high reliability, and lower costs. In a digital audio system, DSP techniques are employed to control audio functions, such as tone control, concert hall emulation, equalization, demodulation, and noise reduction, for example.

A digital audio system typically employs both analog and digital input signals, such as analog signals from a radio tuner and a cassette tape player and digital signals from a compact disc player. The analog input signals must be converted to digital prior to digital signal processing. Once processed, the audio signals are typically converted to analog signals in a digital-to-analog (D/A) converter prior to amplification by an analog power amplifier and reproduction by analog speakers.

A/D conversion can be achieved using stand-alone integrated circuits. Each IC has an associated part cost and requires its own signal path into the DSP IC, supporting functions (such as a clock), and separate packaging space. Thus, it is desirable to minimize the number of converters to be used. DSP ICs are also produced with some A/D converters already included on the integrated circuit. Since the number of such converters is limited, however, it is necessary to utilize them as efficiently as possible.

SUMMARY OF THE INVENTION

The digital signal processing automotive audio system of the present invention comprises a stereo signal source providing a first analog audio signal and a second analog signal. Mixing means are coupled to the stereo signal source for mixing the second audio signal with an analog mixing signal having a predetermined frequency to generate a frequency-shifted audio signal. Summing means are coupled to the stereo signal source and the mixing means for summing the first audio signal and the frequency-shifted audio signal to generate a composite analog signal. The composite analog signal is conducted along a conductor to an A/D converter for generating a composite digital signal. Digital decoding means is coupled to the A/D converter to recover a first digital audio signal and a second digital audio signal. Thus, the invention has the advantage of converting the signals from the stereo signal source to digital using only a single A/D converter.

In a preferred embodiment, the stereo signal source is located at a first location in a vehicle while the A/D converter and the digital decoding means are located at a second location in the vehicle remote from the first location. The conductor interconnecting the summing means and the A/D converter is comprised of a cable linking the first and second location. Thus, the invention has the further advantage of reducing the number of conductors needed in the cable, since a composite signal is carried by a single conductor.

BRIEF DESCRIPTION OF HE DRAWINGS

FIG. 1 is a block diagram showing a prior art digital signal processing audio system wherein separate A/D converters are required for converting the analog stereo signals.

FIG. 2 is a block diagram showing a preferred embodiment of the present invention.

FIG. 3 is a block diagram showing another preferred embodiment of the present invention.

DETAILED DESCRIPTION OF PREFERRED EMBODIMENTS

Referring to FIG. 1, the prior art audio system includes a digital signal processor (DSP) 10. Input audio signals are digitally processed in response to control signals typically generated by a microprocessor responsive to operator commands. The input audio signals are selected from a number of audio sources, such as a radio or tape deck.

An antenna 11 receives broadcast radio signals and provides a radio frequency signal to an analog tuner 12. An intermediate frequency (IF) signal is provided from analog tuner 12 to an A/D converter 13 which provides a digital IF signal to DSP 10. A cassette player 14 provides stereo right and left analog outputs to respective A/D converters 15 and 16. Digitized cassette output signals are provided to DSP 10 which selects between radio or cassette signals based on the control signals. The digitally processed audio signals are provided to respective D/A converters 17 and 18. The analog stereo signals are provided to an amplifier 20 and are reproduced using output speakers 21 and 22.

The prior art configuration of FIG. 1 requires three separate A/D converters as well as three separate signal paths associated with the converters.

A preferred embodiment of the invention shown in FIG. 2 includes a DSP 25 receiving stereo audio signals through a single A/D converter 26. An IF signal from analog tuner 12 is provided to one input of a single-pole, double-throw switch 27 (preferably implemented using solid state devices as is known in the art). The output of switch 27 is connected to the input of A/D converter 26.

A cassette player 28 provides left and right stereo tape signals. The left stereo signal is coupled to one input of a summer 30. The right stereo signal is coupled to one input of a mixer 31. The second input of mixer 31 receives an oscillator signal from oscillator 32 which is a sinusoidal signal defined as $\cos(\omega t)$, where $\omega$ is the frequency. The output from mixer 31 is connected to a second input of sumer 30. The output from summer 30 is coupled to the second input of switch 27.

The mixing signal from oscillator 32, when mixed with the right stereo signal from cassette player 28 in mixer 31, causes a frequency shifting of the right stereo signal by the frequency $\omega$. In order to ensure that the summed signals do not overlap, $\omega$ must be at least twice the highest frequency in the baseband stereo signals. In a preferred embodiment, $\omega$ is about $2\pi \cdot 38,000$ radians per second. The addition of the frequency shifted signal with the left stereo signal in summer 30 creates a composite signal which is transmitted to switch 27 over a conductor 33. When processing cassette signals, switch 27 is placed in the position which couples the composite signal to the input of A/D converter 26. A/D converter 26 samples the composite signal at a sample rate $f_s$, and the digitized composite signal is provided to DSP 25.

DSP 25 includes a digital lowpass filter 34 which receives the composite digital signal and removes frequencies above the baseband audio frequency range recover the left stereo signal in digital form. The composite digital signal is also connected to one input of a digital mixer 35 and to the input of a digital phase-locked loop (PLL) 36. The output of PLL 36 is connected to a digital voltage controlled oscillator (VCO) 37 which provides a digital mixing signal to the remaining input of digital mixer 35. PLL 36 locks to the frequency of the phase-shifted component in the composite digital signal so that the digital mixing signal produced by VCO 37 has a frequency and phase equal to the original analog mixing signal from analog oscillator 32. Preferably, the frequency of the mixing signals is one-fourth the sampling frequency $f_s$.

The frequency-shifted portion of the composite digital signal is thus shifted back to its original analog frequency by digital mixer 35. The output of digital mixer 35 is connected to the input of a lowpass filter 38 which blocks all frequencies in the mixer output above the baseband frequency range to recover the original right stereo signal in digital form. Thus, the invention obtains left and right stereo digital signals using only a single A/D converter.

The preferred embodiment of FIG. 2 further shows the separation of an audio system into a front control unit 40 and a rear control unit 41. Thus, the audio system is a distributed audio system wherein various components are located throughout the vehicle. Front control unit 40 is preferably located in the front dashboard of a vehicle while rear control unit 41 is preferably located in the trunk of a vehicle. The front and rear control units are linked by a cable including conductor 33. Front control unit 40 typically includes operator control buttons for generating commands signals which are coupled from the front control unit to rear control unit 41 over other conductors (not shown).

Distributed systems are employed to conserve space in the dashboard and to remove heat generating components such as the audio amplifier from the dashboard. Cassette player 28 is located in the front control unit to facilitate tape operation by the vehicle occupants. The present invention has the further advantage of reducing by one-half the number of conductors needed to transmit the stereo cassette signals from the front control unit 40 to the rear control unit 41.

FIG. 3 shows an alternative embodiment employing a single A/D converter for digitizing stereo audio signals, but using a pair of stereo conductors 51 and 52 between front and rear control units 40 and 41 in a distributed system. Thus, summer 30 and mixer 31 have been moved into rear control unit 41 in order to uses a common signal source for the mixing signals used in the mixing operations, thereby eliminating the need for a phase-locked loop. A clock 45 provides clock signal at a predetermined frequency to a divider 46 which divides the clock signal by a predetermined ratio. The divided signal from divider 46 is provided to mixer 31 as a square-wave mixing signal. A lowpass filter 47 connected between added 30 and A/D converter 26 removes harmonic frequencies generated because of the use of a square-wave mixing signal. The clock signal is further divided by a divider 50 to provide a sample-rate signal at sampling rate $f_s$ to A/D converter 26.

DSP 25 includes a divider 48 for dividing the clock signal according to the predetermined ratio so that an identical mixing signal is provided to digital mixer 35. Complicated processing in DSP 25 to implement phase-locking is thus avoided.

What is claimed is:

1. A digital signal processing automotive audio/ system having an analog audio source, comprising:
    a stereo signal source providing a first analog audio signal and a second analog audio signal;
    mixing means coupled to said stereo signal source for mixing said second audio signal with an analog mixing signal having a predetermined frequency to generate a frequency-shifted audio signal;
    summing means coupled to said stereo signal source and said mixing means for summing said first audio signal and said frequency-shifted audio signal to generate a composite analog signal;
    an analog-to-digital converter coupled to said summing means and receiving said composite analog signal for generating a composite digital signal; and
    digital decoding means coupled to said analog-to-digital converter for recovering a first digital audio signal and a second digital audio signal.

2. The audio system of claim 1 wherein said stereo signal source is located at a first location in a vehicle and wherein said digital decoding means are located at a second location in said vehicle remote from said first location, said audio system further comprising a cable linking said first and second locations.

3. The audio system of claim 1 wherein said digital decoding means is comprised of:
    a first digital filter for separating said first digital audio signal from said composite digital signal;
    digital mixer means coupled to said analog-to-digital converter for mixing said composite digital signal with a digital mixing signal having said predetermined frequency; and
    a second digital filter coupled to said digital mixer means for separating said second digital audio signal.

4. The system of claim 3 wherein said digital mixing means is comprised of a digital phase-locked loop and a digital multiplier.

5. A method for converting first and second analog audio signals from a stereo audio source to first and second digital audio signal in an automotive audio system with digital signal processing, comprising the steps of:
    mixing said second analog audio signal with an analog mixing signal having a predetermined frequency to generate a frequency-shifted audio signal;
    summing said first analog audio signal and said frequency-shifted audio signal to generate a composite analog signal;
    sampling said composite analog signal to generate a composite digital signal; and
    digitally decoding said composite digital signal to recover said first digital audio signal and said second digital audio signal.

* * * * *